UNITED STATES PATENT OFFICE.

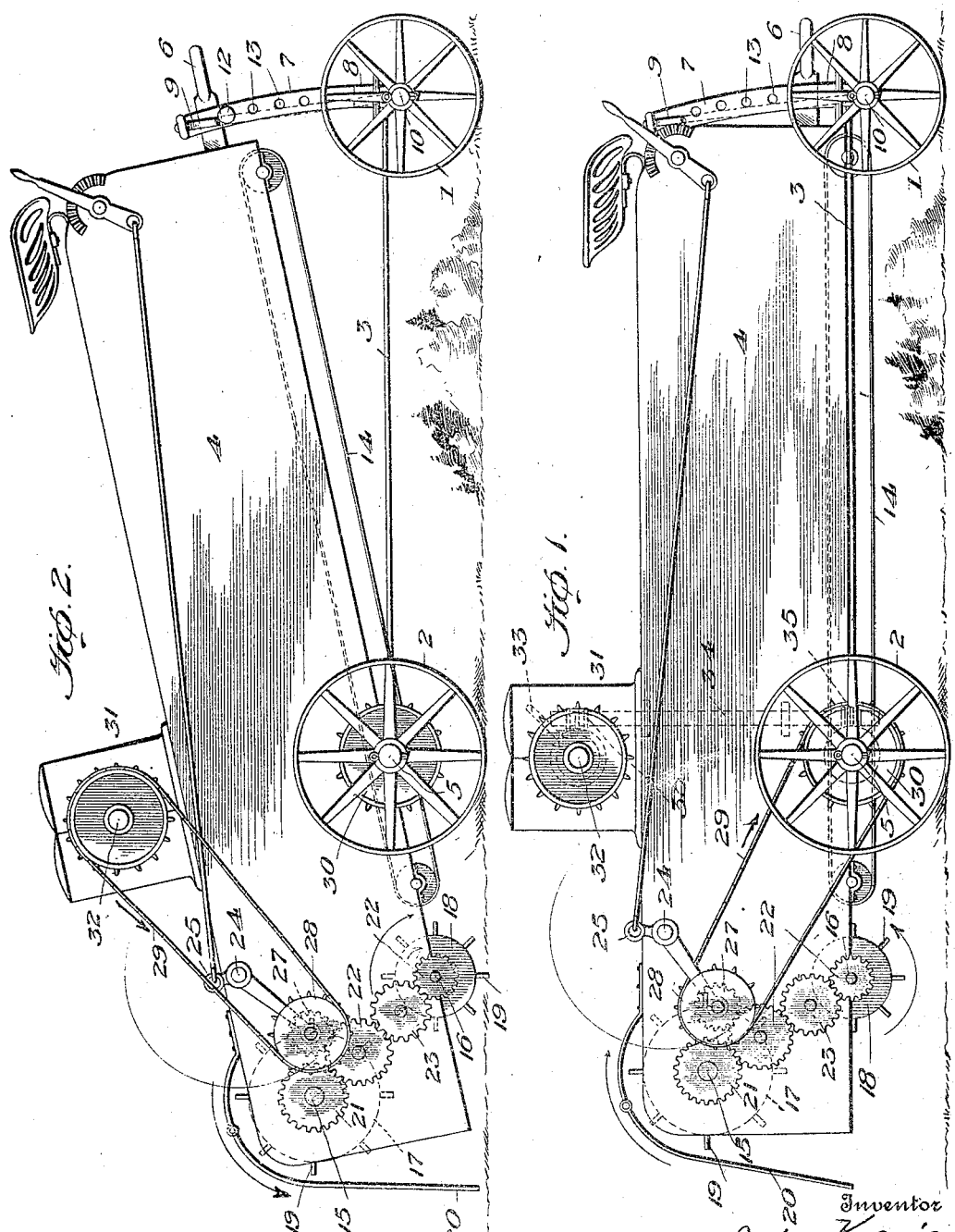

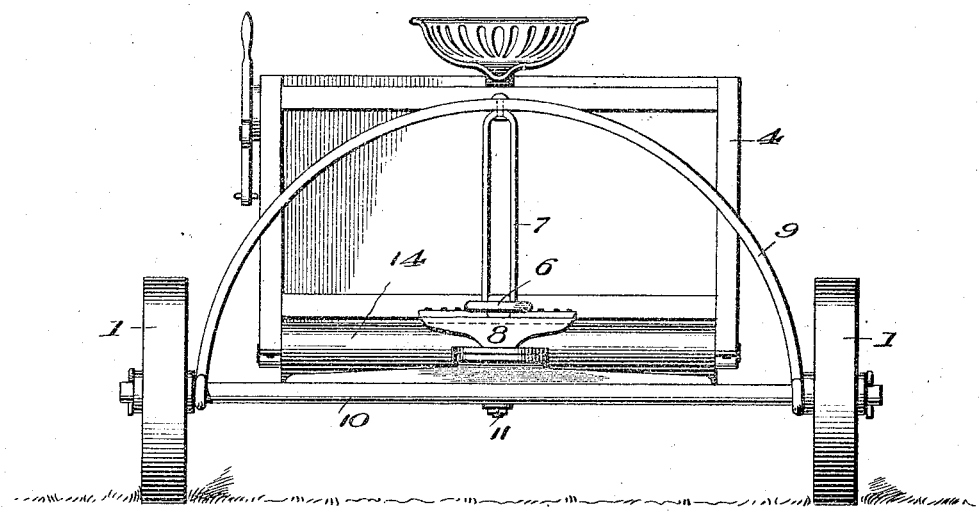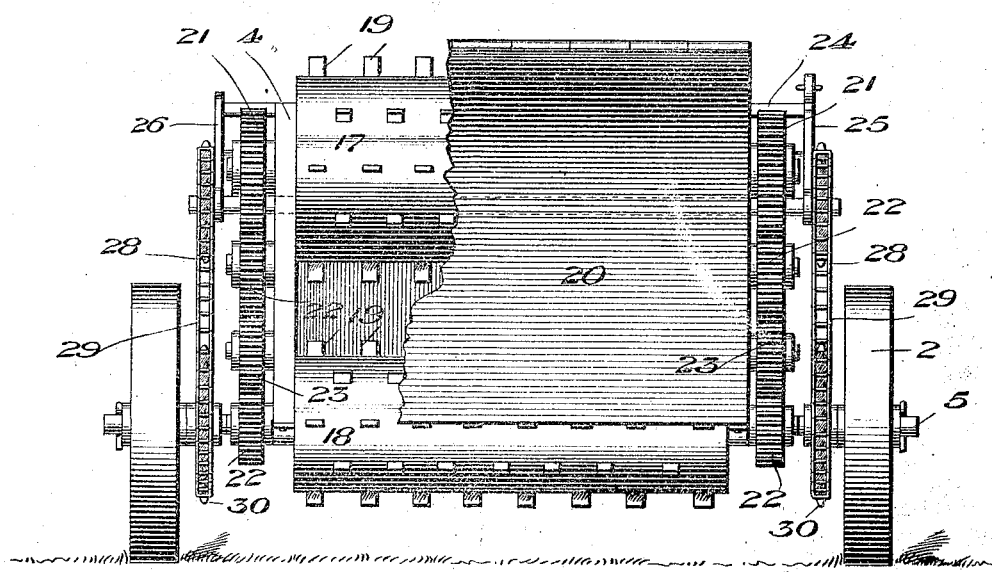

WILLIAM JOHN KOENIG, OF UNDERWOOD, NORTH DAKOTA.

COMBINED MANURE LOADER AND SPREADER.

1,125,122.  Specification of Letters Patent.  Patented Jan. 19, 1915.

Application filed June 22, 1914. Serial No. 346,587.

*To all whom it may concern:*

Be it known that I, WILLIAM JOHN KOENIG, a citizen of the United States, residing at Underwood, county of McLean, and State of North Dakota, have invented certain new and useful Improvements in Combined Manure Loaders and Spreaders, of which the following is a specification.

This invention relates to combined manure loaders and spreaders.

My object is to provide an improved self-loading manure spreader of simple construction, adapted for operation by the ground wheels, or by a motor, and utilizing the same beaters for both loading and spreading.

The foregoing object is accomplished by providing beaters relatively arranged in an improved manner and driven by improved reversible gearing, whereby when rotating in one direction the beaters are adapted to coöperate to elevate the manure from the ground into the vehicle body or container and when rotated in the opposite direction, to coöperate to take the manure from the vehicle and to spread it on the ground.

Preferably, my improvements are used in connection with a vehicle having a feeding apron or conveyer for delivering the manure thereto and when used in that connection, the apron may be operated in any desired manner. The vehicle may be horse drawn or motor propelled.

I may use in connection with my improved beaters and gearing, a motor carried by the vehicle and also propel the vehicle by said motor. The motor may only be employed for solely propelling the vehicle backwardly while also operating the beaters to thereby accomplish the loading of the machine, but I do not restrict the driving of the vehicle only to the rearward propulsion thereof. The motor may be used for driving the beaters to spread the manure.

The present invention, by using the same mechanism to load the machine and to spread the manure, permits a very large carrying capacity as the operative parts are all at the rear of the machine and the vehicle is otherwise free to hold the load of manure.

The invention also consists in the provision of an elevating body for the vehicle, so balanced that one man may tilt the entire body on the running gear to position the apparatus for loading the manure direct from the ground and may return the loaded body to lowered position, so that the machine will be ready for use as a manure spreader.

Preferably, a guard or shield will be used in connection with the beaters to properly direct the stream of manure during loading and unloading.

The invention consists in other features of construction, details and combinations of parts appearing more fully hereinafter.

In the accompanying drawings: Figure 1 is a side elevation of the machine when in position for spreading; Fig. 2, a similar view when in loading position; Fig. 3, a front elevation; and Fig. 4, a rear elevation.

The vehicle, whether horse-drawn or motor propelled is provided with front steering ground wheels 1 and rear ground wheels 2 having suitable reaches 3. The body 4 is suitably pivotally mounted on the rear axle 5 so that it can tilt up and down on said axle. The disposition of the weight on opposite sides of the axle 5 is such that when unloaded, the body may be readily raised by a single person without much effort and to that end, I preferably, provide a handle 6 attached to the body 4. To support the body in the raised position shown in Fig. 2, there is provided a slotted standard 7 in which the handle 6 travels. The standard rises from the upper bolster 8 and is braced by an arch 9 connected to the front axle 10. Thus, the front wheels 1 may readily turn with the axle 10 on the king bolt 11, whether the machine be in the position shown in Fig. 1, or in that of Fig. 2. To support the weight of the manure as it is loaded into the body 4 when in the position shown in Fig. 2, any suitable securing means may be provided for the handle 6, as, for instance, a removable pin or bolt 12 passing through holes 13 in the sides of the standard 7. When the body 4 is suitably loaded, the bolt or pin 12 is pulled out and as the greater part of the load is then forward of the rear axle 5, the body 4 will lower itself by gravity. On the other hand, when the body 4 is substantially empty, the mechanism at the rear of the body substantially balances the weight of the front part of the latter and, consequently, the body may readily be raised to the position shown in Fig. 2.

Any suitable means may be provided for automatically feeding or shifting the load of manure to the spreading or distributing apparatus. I have shown an endless apron or belt 14 which may have a scoop or pusher. This apron may be operated in any desired manner to cause it to advance as the load is taken on, or, to move rearwardly to present its load to the distributing apparatus and constitutes no part of the present invention.

Mounted in suitable bearings carried by the body 4 at the rear thereof, are the upper and lower shafts 15 and 16 of the beaters 17 and 18 which are used both for spreading and for loading the manure. The beaters have teeth or blades 19 which are preferably somewhat flat to enable them to properly engage the manure. The beater 18 is preferably of somewhat smaller diameter than the beater 17, as said beater 18 is used both in loading and distributing as a feeder to throw the manure to the beater 17, but there is a coöperative relation between the two beaters both in loading and distributing. The beater 18 is so located that when the body 4 is tilted, as shown in Fig. 2, the teeth of the beater 18 will engage a pile of manure on the ground for purposes of throwing it to the beater 17. The beaters 17 and 18 then turn toward each other and inwardly toward the body, the upper beater 17 rotating in a counterclockwise direction and the lower beater 18 in a clockwise direction. When the machine is traveling in the field, the beater 18 is raised above the surface of the ground, as shown in Fig. 1, and it then rotates in a counterclockwise direction toward the beater 17 which rotates clockwise toward the rear of the machine, that is, outwardly in relation thereto and as a result thereof, the manure is taken by both the beaters, the beater 18 acting as more of a feeder than adjacent feeder 17 and the manure is spread to the rear of the machine.

A guard or deflector 20 is arranged over a portion of the beater 17 and depending downwardly below it to a sufficient distance so that when the machine is in the condition shown in Fig. 1, the manure thrown rearwardly by the beaters 17 and 18 strikes the said guard 20 and is deflected down onto the ground. On the other hand, when the machine is loading, as in Fig. 2, the manure thrown upwardly and rearwardly by the beater 18, strikes the guard 20 and is deflected thereby into the path of the vanes of the beater 17, which thereupon throw it into the body 4. The two beaters are spaced apart a sufficient distance so that the free flow of the manure either inwardly or outwardly of the machine may be had.

Gears 21 and 22, preferably of about the same size and having about the same number of teeth, are provided respectively on opposite ends of the shaft 15 and on stub shafts carried by the body 4. Multiplying gear 23 connects the gears 22 to the shaft 16 at opposite ends of the beater 18. It will be seen, therefore, that the beater 18 will revolve considerably faster than the beater 17 and will, consequently, feed the manure more rapidly than will the beater 17 when the manure is being spread. Similarly, when the manure is being loaded into the body 4, the beater 18 will take it up very rapidly so as to insure a sufficient quantity of manure being thrown to the beater 17 to keep the latter working to its full capacity.

Mounted in the sides of the body 4 is a shaft 24 which carries a bell-crank at one end and an arm 26 at the other end. The arms 25 and 26 permit gears 27 to mesh with the gears 22 or with the gears 21. As shown in Fig. 1 the beaters are driven from the gears 27 by sprockets 28 which are in turn rotated by sprocket chains 29 running over sprockets 30 which are carried by the axle 5.

Referring to Fig. 1, it will be seen that when the machine is drawn or propelled forwardly, the rotation of the wheels 2 will cause the beaters 17 and 18 to be revolved as shown by the arrows and they will then spread the manure. If the machine is backed, when gears 22 and 27 are engaged the beaters will be revolved in a direction opposite to that just set forth. As the rearward movement of the vehicle would result in soon disposing the machine beyond the manure pile from which the load was to be taken, I unship the chain 29 when the machine is to be loaded and connect the sprocket wheel 28 by the sprocket chain 29 to a suitable motor, such as a gasolene engine 31. The beaters 17 and 18 may then be driven as rapidly as desired for purposes of loading, the machine being then in the position shown in Fig. 2 with the body 4 elevated so that the beater 18 will readily engage the manure pile. In order that the machine may very slowly back as the manure is taken up from the pile, I preferably connect the shaft 32 of the motor by any suitable releasable clutch 33, to a worm shaft 34 having worm gearing 35 to drive the rear wheels 2. The rotation of the shaft 32 operates the gearing for the beaters and also slowly backs the machine. When the machine is loaded, the clutch 33 is released and the sprocket chain 29 reëngaged with the sprocket wheel 30 and the body lowered to the position shown in Fig. 1, whereupon the machine may be drawn forward and the manure spread.

The machine can be loaded by driving it over the ground when drawn by horses, where the manure is not in big piles, as, for instance, in feed lots.

If it is desired to rapidly drive the beaters by the motor 31 when distributing or spreading the manure, the chain 29 can be connected to the sprocket of the motor, and the gears 27 swung into mesh with gears 21, whereupon the beaters will rotate in the direction shown by the arrows, Fig. 1, and will distribute the manure regardless of the direction of travel of the machine.

Having thus described my invention, what I claim as new and desire to secure by Letters Patent, is:—

1. In a combined manure loader and spreader, the combination of beaters, and means for revolving said beaters in either direction according as it is desired to load or spread the manure.

2. In a combined manure loader and spreader, the combination with beaters adapted to revolve in either direction, of gearing connecting said beaters, and a shiftable driving gear adapted when in one position to drive the beaters in a direction adapting them for loading the machine and when in another position to drive them in a direction adapted for spreading the manure.

3. In a combined manure loader and spreader, the combination with a vehicle having ground wheels and a tiltable body, of beaters carried by the body and adapted to revolve in either direction, one of said beaters being arranged so that it will be adapted to engage a pile of manure when the body is tilted, for the purpose of loading the body, and means for driving the beaters to either load or spread the manure.

4. In a combined manure loader and spreader, the combination of beaters and means for driving them forwardly or rearwardly, said beaters being adapted to coöperate in throwing or feeding the manure from one to the other.

5. In a combined manure loader and spreader, the combination of beaters and means for driving them forwardly or rearwardly, said beaters being adapted to coöperate in throwing or feeding the manure from one to the other, and a guard or deflector against which the manure strikes when it is being loaded or distributed.

6. In a combined manure loader and spreader, the combination with ground wheels and a tiltably mounted body, of upper and lower beaters, a guard or deflector, and means for rotating the beaters in either direction, said beaters being adapted, when rotated in one direction, to throw the manure against the guard or deflector to accomplish spreading of the manure and when the body is tilted, for the lower beater to engage a pile of manure and throw it to the guard or deflector and the other beater to thereby load the body.

7. In a combined manure loader and spreader, having ground wheels, the combination with beaters adapted to revolve both forwardly and rearwardly, of means controlling the direction of revolution of the beaters, a motor, and means for driving the beaters in either direction either from the motor or from the ground wheels of the vehicle.

8. In a combined manure loader and spreader having ground wheels, the combination of beaters adapted to revolve in both directions, means controlling the direction of revolution of the beaters, a motor, a controllable operative connection between the motor and the ground wheels, and means for driving the beaters either from the motor or from the ground wheels.

9. In a combined manure loader and spreader, having ground wheels, the combination with beaters adapted to revolve either forwardly or rearwardly, of a motor, and means for driving the beaters either from the motor or from the ground wheels.

10. In a combined manure loader and spreader, having ground wheels, the combination with beaters adapted to revolve either forwardly or rearwardly, of a motor, means for driving the beaters either from the motor or from the ground wheels, and an operative connection between the motor and the ground wheels whereby the machine may be propelled while the beaters are being driven by the motor.

In testimony whereof, I hereunto affix my signature in presence of two witnesses.

WILLIAM JOHN KOENIG.

Witnesses:
W. M. DASHIELL,
S. V. LOCKWOOD.